US005322314A

United States Patent [19]

Blum

[11] Patent Number: 5,322,314
[45] Date of Patent: Jun. 21, 1994

[54] THIN GOOSENECK ASSEMBLY

[75] Inventor: Louis F. Blum, Monticello, Ind.

[73] Assignee: Rosby Corporation, Monon, Ind.

[21] Appl. No.: 926,929

[22] Filed: Aug. 7, 1992

[51] Int. Cl.⁵ ............................................. B62D 53/06
[52] U.S. Cl. .................................. 280/423.1; 280/400;
   280/786; 280/789; 280/797; 296/182
[58] Field of Search ................. 280/400, 417.1, 423.1,
   280/425.2, 441.2, 797, 798, 799, 800, 785, 786,
   789, 796; 52/729, 731.3, 731.6, 731.7; 296/181,
   182, 204, 205

[56] References Cited

U.S. PATENT DOCUMENTS

| 2,417,640 | 3/1947 | Fischbach | 280/423.1 |
| 3,043,628 | 7/1962 | Hockensmith | 280/423.1 |
| 3,612,569 | 10/1971 | Martinelli | 280/423.1 |
| 3,856,344 | 12/1974 | Loeber | 280/789 |
| 4,938,524 | 7/1990 | Straub et al. | 280/799 |

FOREIGN PATENT DOCUMENTS 0108279  8/1939  Australia ............................ 280/789

Primary Examiner—Robert P. Olszewski
Assistant Examiner—Anne Marie Boehler
Attorney, Agent, or Firm—Locke Reynolds

[57] ABSTRACT

A thin gooseneck assembly is provided for use in the chassis of a semi-trailer intended for hauling freight containers. The gooseneck assembly is formed by a fabricated tube extending longitudinally to define substantially the entire length of the gooseneck. The fabricated tube includes a lower plate having a pair of upstanding side defining flanges. A rearward portion of the lower plate includes a pair of longitudinal slots for receiving in fixed relation the web of a longitudinal beam which extends from the gooseneck to the rearward end of the semi-trailer. The top flange of each longitudinal beam is fixed to an upper surface of the lower plate so that a lower surface of each top flange is in surface-to-surface contact with the lower plate upper surface. An upper plate is positioned parallel to the lower plate and fixed to upper portions of the side-defining flanges. A kingpin for coupling the chassis to a tractor fifth wheel projects downward through the lower plate of the fabricated tube. A rearward margin of the upper plate of the gooseneck assembly includes a downwardly inclined portion joining the upper plate to an upper surface of the top flanges of the longitudinal beams.

20 Claims, 3 Drawing Sheets

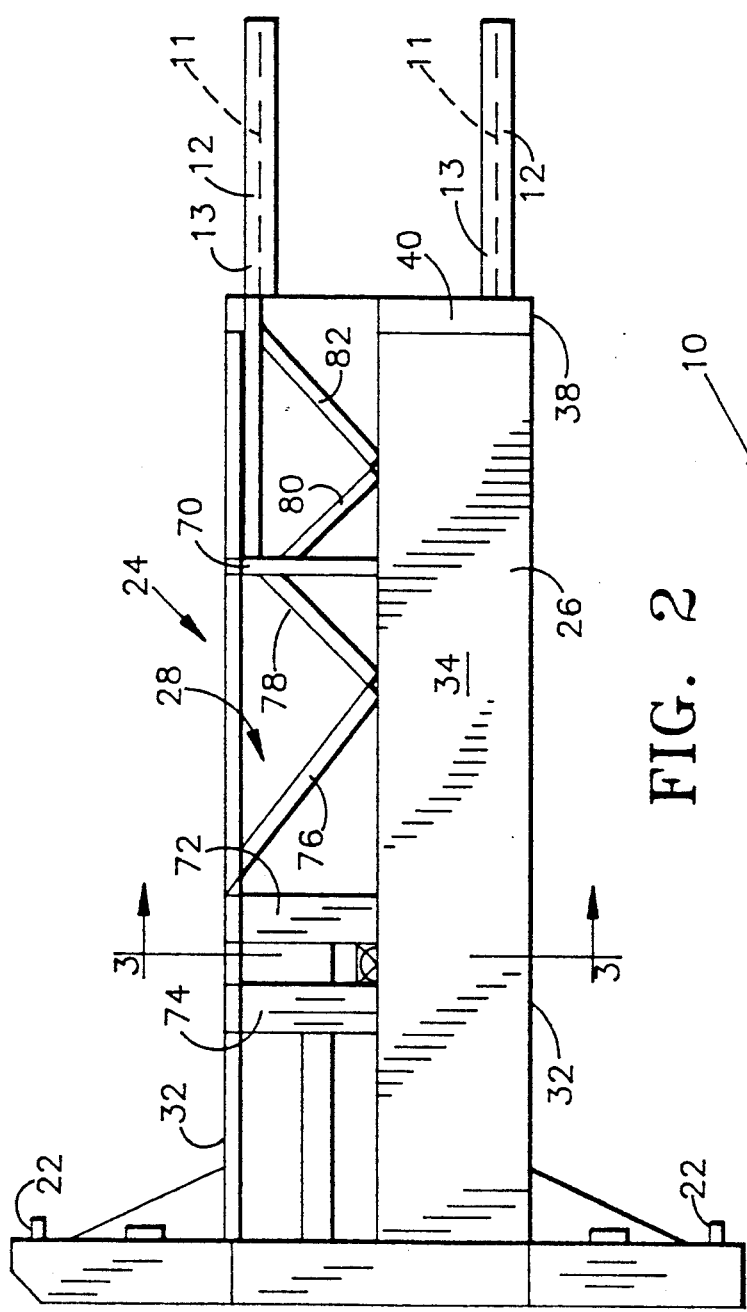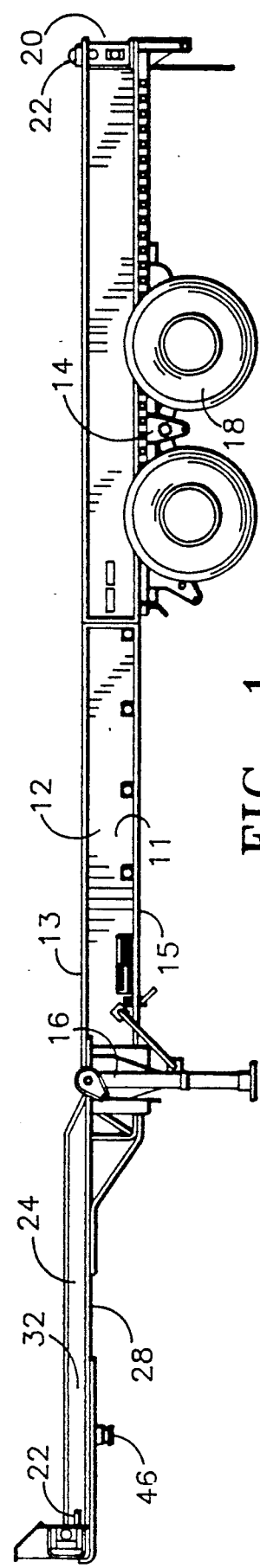

THIN GOOSENECK ASSEMBLY

BACKGROUND OF THE INVENTION

1. Field of the Invention

This invention relates generally to land vehicles having a frame or chassis intended to carry containers of standardized dimension used in multi-mode transportation of freight. The invention particularly relates to such land vehicles having a thin gooseneck assembly in the chassis to permit containers of greater height with correspondingly greater cargo capacity to be carried.

2. Description of the Prior Art

The use of containers of standardized dimension in multi-mode transportation of freight is becoming increasingly common. The freight containers intended to be carried by the chassis of the present invention are generally constructed in certain standardized incremental lengths. The containers additionally are adapted for use on rail cars and particularly on board ship in a stacked arrangement as shown in U.S. Pat. No. 3,646,609. Such containers are constructed such that the total gross weight of the container is adapted to be supported by the tunnel area and by four steel castings generally located on the four outer most lower corners of the container.

A trailer chassis carrying such a container must therefore provide support for the tunnel area of the container and at the four support castings locations. The trailer chassis usually includes the conventional sort of container locks at the casting support locations. Since the gross weight of the container is carried by tunnel area as well as the four outer most corners of the chassis, this load supporting arrangement puts severe structural demands on the underlying chassis construction. To maximize the load carrying capacity of the chassis, it is desirable to make the chassis as light as possible thereby permitting a greater fraction of the total gross weight to be in the freight carried within the container. An increase in cargo capacity of the container can be achieved by maximizing its interior dimensions while maintaining the exterior dimensions of the container within specified limits. Containers of greater interior height with correspondingly increased cargo capacity can be achieved by diminishing the thickness of the floor of the container. The thinner floor is not compatible with the use of a standard gooseneck assembly in the chassis. Thus an object of the present invention is to construct a chassis which allows containers of greater height with correspondingly increased cargo capacity to be carried than would be achievable with a standard and conventional gooseneck.

SUMMARY OF THE INVENTION

In the present invention, a vertically thin gooseneck assembly is employed which is strongly joined to the remainder of the chassis to permit a larger volume of cargo to be carried due to the extra height afforded by the thin gooseneck which can be translated to increased container height. The thin gooseneck assembly forms a forward end of a chassis generally including a pair of spaced apart longitudinal beams extending rearwardly from the gooseneck assembly to the rearward end of the chassis. Each longitudinal beam includes a top flange and a bottom flange united by a web. A fabricated tube extends longitudinally to define substantially the entire length of the gooseneck. The fabricated tube includes a lower plate having a pair of upstanding longitudinally extending flanges defining the sides of the fabricated tube. A rearward portion of the lower plate including a pair of longitudinal slots, each slot receiving in fixed relation the web of one of the longitudinal beams. The fabricated tube also includes an upper plate positioned parallel to the lower plate and fixed to upper portions of the side-defining flanges. The gooseneck assembly includes a kingpin projecting through the lower plate for coupling the chassis to a tractor fifth wheel.

In the preferred embodiment a rearward margin of the upper plate of the gooseneck assembly includes a downwardly inclined portion joining the upper plate to an upper surface of the top flanges of the longitudinal beams. The top flange of each longitudinal beam is fixed to an upper surface of the lower plate of the fabricated tube so that a lower surface of each top flange is in surface-to-surface contact with the lower plate upper surface. These features provide for a strong coupling between the gooseneck assembly and the remaining portion of the chassis.

Preferably, the gooseneck assembly also includes a plurality of cross members fixed between the upper and lower plates for maintaining the upper and lower plates in parallel relation. Vertically oriented web extensions are fixed to each top flange upper surface in planar alignment with the web of each longitudinal beam, the web extensions running from a rearward margin of the upper plate of the gooseneck assembly to a rearmost of the cross members fixed between the upper and lower plates. These features minimize any deflection of the gooseneck assembly during use.

In the preferred embodiment, the forward end of each longitudinal beam web includes a upwardly and forwardly tapered edge. A beam closeout tie is joined to this edge which has a first portion attached to a lower surface of the lower plate of the fabricated tube and another portion attached to a lower surface of the bottom web of each beam. A first web stiffening means extends from a forward end of the lower flange of each longitudinal beam to a rearward margin of the lower plate, and second web stiffening means extends perpendicularly from a forward end of the lower flange of each longitudinal beam to the lower surface of the lower plate.

Since the containers are commonly used on board ship and the chassis is often used to transport the container to the ship for loading thereon, it is desirable that the chassis be highly resistant to corrosion of the type experienced in the vicinity of sea water. Certain of the structural features included in the chassis of the present invention are designed with corrosion avoidance in mind. Additional features and advantages of the present invention will become apparent to those skilled in the art upon consideration of the following description of a preferred embodiment exemplifying the best mode of carrying out the invention as presently perceived. The detailed description particularly refers to the accompanying drawings.

BRIEF DESCRIPTION OF THE DRAWINGS

FIG. 1 is a side elevational view of a chassis having a thin gooseneck assembly according to the present invention.

FIG. 2 is a top elevational view of a thin gooseneck assembly in accordance with the present invention with one-half of the top plate removed to reveal internal structure.

DESCRIPTION OF THE PREFERRED EMBODIMENT

Figure 3:
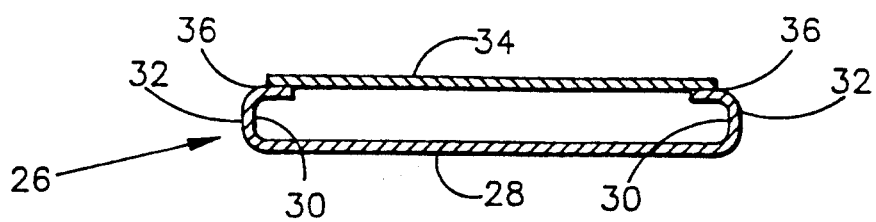
FIG. 3 is a sectional view taken along lines 3—3 of FIG. 2.

A semi-trailer chassis 10 in accordance with the present invention as shown in FIG. 1 is intended for use in connection with multi-mode transportation freight containers. The trailer chassis 10 which can be of variable length includes a pair of spaced longitudinal beams 12 to which a running gear 14 and a landing gear 16 are attached in the conventional manner. The longitudinal beams 12 are composed of a vertical web 11 joining a top flange 13 to a bottom flange 15. The running gear 14 includes a set of wheels 18 which can be adjustably positioned near a rear end 20 of the trailer 10 for supporting the trailer above a road surface. A plurality of coupling members 22 are provided for coupling the trailer 10 to the containers in the usual manner.

The container chassis 10 shown in FIG. 1 is provided with a thin gooseneck assembly 24 in accordance with the present invention. A top elevational view of such a thin gooseneck assembly 24 is shown in FIG. 2. A thin gooseneck assembly 24 in accordance with the present invention includes a fabricated tube 26 which extends longitudinally to define substantially the entire length of the gooseneck 24. The fabricated tube 26 shown in section in FIG. 3 includes a lower plate 28 having a pair of upstanding longitudinally extending flanges 30 defining the sides 32 of the fabricated tube 26. The fabricated tube 26 also includes an upper plate 34 positioned parallel to the lower plate 28 and fixed to upper portions 36 of the side-defining flanges 30. A rearward margin 38 of the upper plate 34 of the gooseneck assembly 24 includes a downwardly inclined portion 40 joining the upper plate 34 to an upper surface 42 of the top flanges 13 of the longitudinal beams 12.

Figure 4:
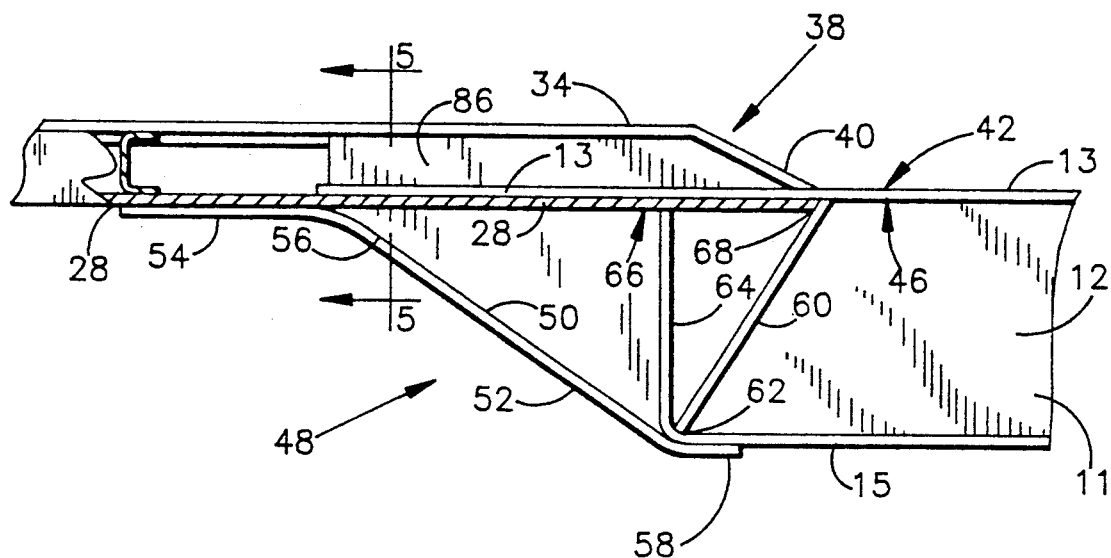
FIG. 4 is an enlarged sectional view of the junction of the thin gooseneck assembly to the longitudinal beams of the trailer chassis.
Figure 5:
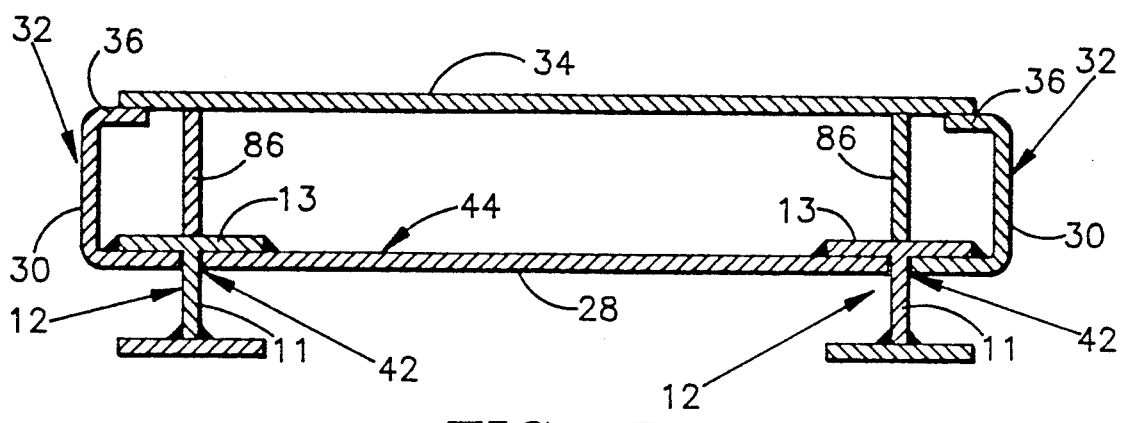
FIG. 5 is a sectional view taken along lines 5—5 in FIG. 4.

A rearward portion of the lower plate 28 includes a pair of longitudinal slots 42 as shown in FIG. 5. Each slot receives the web 11 of one of the longitudinal beams 12. The top flange 13 of each longitudinal beam 12 is welded or otherwise fixed to an upper surface 44 of the lower plate 28 of the fabricated tube 26 so that a lower surface 46 of each top flange 13 is in surface-to-surface contact with the upper surface 44 of lower plate 28 as shown in FIGS. 4 and 5. A kingpin 46 projects through the lower plate 28 for coupling the chassis 10 to a tractor fifth wheel in the conventional manner.

As shown in FIG. 4, a forward end 48 of the web 11 of each longitudinal beam 12 includes a upwardly and forwardly tapered edge 50. A flange joining means in the form of beam closeout tie 52 joins the lower flange 15 of each longitudinal beam 12 to the lower plate 28 of the fabricated tube 26. The beam closeout tie 52 includes a first portion 54 attached to a lower surface of the lower plate 28, a second portion 56 joined to the upwardly and forwardly tapered edge 50, and a third portion 58 attached to a lower surface of the bottom web 15 of beam 12. A first web stiffening means 60 extends from a forward end 62 of the lower flange 15 of each longitudinal beam 12 to a rearward margin 68 of the lower plate 28. A second web stiffening means 64 extends perpendicularly from the lower flange forward end 62 to the lower surface 66 of the lower plate 28.

Figure 6:
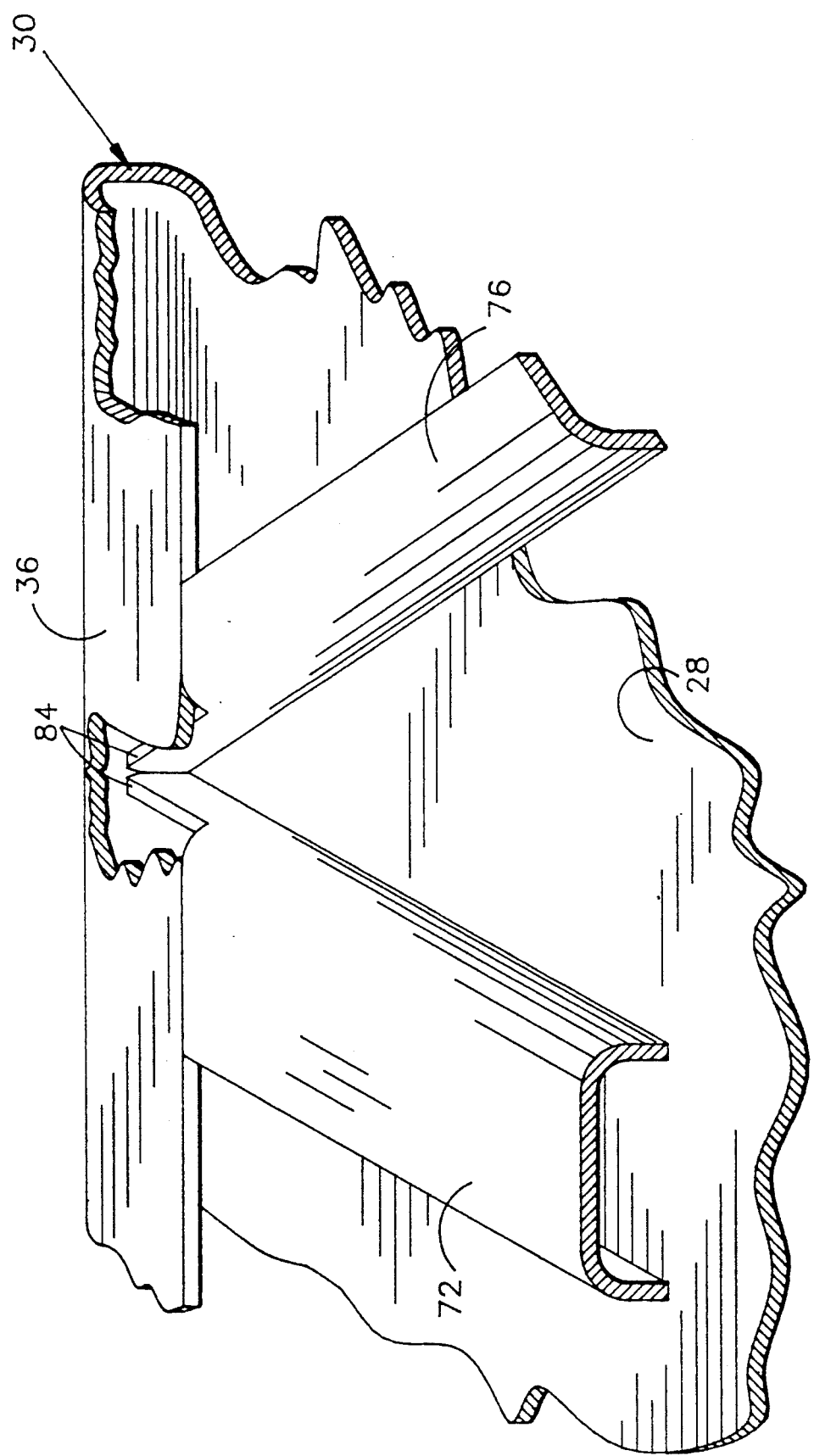
FIG. 6 is perspective view of a portion of the cross members maintaining the upper and lower plates in parallel relation.

The gooseneck assembly 26 includes a plurality of lateral cross members 70, 72 and 74 as shown in FIGS. 2 and 6 which are fixed between the upper and lower plates 28 and 34 for maintaining the upper and lower plates in parallel relation. The gooseneck assembly 26 additionally includes a plurality of diagonal cross members 76, 78, 80, and 82 which also aid in maintaining the upper and lower plates in parallel relation. As shown in detail in FIG. 6, the ends of the cross members include notches 84 which permit the insertion of the cross member end under the upper portions 36 of the side-defining flanges 30. In this manner the upper surfaces of the cross members are essentially coplanar with the upper portions 36 to support the lower surface of the upper plate 34.

Between the rearmost lateral cross member 70 and the downwardly inclined portion 40 of the upper plate 34, vertically oriented web extensions 86 are fixed to the upper surface of each top flange 13 in planar alignment with the web 11 of each longitudinal beam 12 as shown in FIGS. 4 and 5. The web extensions 86 are maintained in their vertical orientation by being welded or otherwise fixed to the ends of diagonal cross members 80 and 82 as shown in FIG. 2. The vertical thickness dimension of a gooseneck assembly according to the present invention can be as little as about three inches while conventional gooseneck assemblies are typically about five and one-half inches thick. This savings of more than two inches can be usefully translated into increased capacity for containers by adopting a corresponding thinner tunnel structure for the containers.

Although the invention has been described in detail with reference to the preferred embodiment, variations and modifications exist within the scope and spirit of the invention as described and as defined in the following claims.

What is claimed is:

1. A chassis for hauling freight containers, the chassis including a pair of spaced apart longitudinal beams, each beam having a top flange and a bottom flange united by a web, and a gooseneck assembly secured to a forward end of the beams, the assembly including a kingpin for coupling the chassis to a tractor fifth wheel, the gooseneck assembly comprising:

a longitudinally extending fabricated tube including an upper plate and a lower plate positioned parallel to each other, a rearward portion of the lower plate including a pair of longitudinal slots, each slot receiving in fixed relation the web of one of said longitudinal beams, and a vertically oriented web extension fixed to each top flange upper surface in planar alignment with the web of each longitudinal beam, the web extension running from a rearward margin of said upper plate of the gooseneck assembly to a point forward of forward end of each web of the longitudinal beams.

2. The chassis of claim 1 wherein said forward end of each longitudinal beam web includes an upwardly and forwardly tapered edge and a flange joining means for joining the lower flange of each longitudinal beam to said lower plate of the fabricated tube.

3. The chassis of claim 2 wherein the flange joining means comprises web closeout ties having a first portion attached to a lower surface of the lower plate of the fabricated tube, a second portion joined to the upwardly and forwardly tapered edge of the web of each longitudinal beam, and a third portion attached to a lower surface of the bottom web of each beam.

4. The chassis of claim 3 wherein said flange joining means further comprises web stiffening means extending from a forward end of the lower flange of each longitudinal beam to a rearward margin of said lower plate for stiffening the web of the longitudinal beam against deflection.

5. The chassis of claim 4 wherein said flange joining means further comprises web stiffening means extending perpendicularly from a forward end of the lower flange of each longitudinal beam to the lower surface of said lower plate for stiffening the web of the longitudinal beam against deflection.

6. A chassis for hauling freight containers, the chassis including a pair of spaced apart longitudinal beams, each beam having a top flange and a bottom flange united by a web, and a gooseneck assembly secured to a forward end of the beams, the assembly including a kingpin for coupling the chassis to a tractor fifth wheel, the gooseneck assembly comprising:

a longitudinally extending fabricated tube including an upper plate and a lower plate positioned parallel to each other, a rearward portion of the lower plate including a pair of longitudinal slots, each slot receiving in fixed relation the web of one of said longitudinal beams, a lower surface of the top flange of each longitudinal beam being fixed contiguously to an upper surface of the lower plate of the fabricated tube.

7. The chassis of claim 6 wherein the gooseneck assembly additionally includes a plurality of cross members fixed between the upper and lower plates for maintaining said upper and lower plates in parallel relation.

8. The chassis of claim 7 wherein the gooseneck assembly additionally includes a vertically oriented web extension fixed to each top flange upper surface in planar alignment with the web of each longitudinal beam, the web extension running from a rearward margin of said upper plate of the gooseneck assembly to a rearmost of said cross members fixed between the upper and lower plates.

9. The chassis of claim 7 wherein said forward end of each longitudinal beam web includes: an upwardly and forwardly tapered edge, and a beam closeout tie having a first portion attached to a lower surface of the lower plate of the fabricated tube, a second portion joined to the upwardly and forwardly tapered edge of the web of each longitudinal beam, and a third portion attached to a lower surface of the bottom web of each beam.

10. The chassis of claim 9 further comprising first web stiffening means extending from a forward end of the lower flange of each longitudinal beam to a rearward margin of said lower plate, and second web stiffening means extending perpendicularly from a forward end of the lower flange of each longitudinal beam to the lower surface of said lower plate.

11. A chassis for hauling freight containers, the chassis including a pair of spaced apart longitudinal beams, each beam having a top flange and a bottom flange united by a web, and a gooseneck assembly secured to a forward end of the beams, the assembly including a kingpin for coupling the chassis to a tractor fifth wheel, the gooseneck assembly comprising:

a longitudinally extending fabricated tube including an upper plate and a lower plate positioned parallel to each other, a rearward portion of the lower plate including a pair of longitudinal slots, each slot receiving in fixed relation the web of one of said longitudinal beams, a rearward margin of said upper plate of the gooseneck assembly comprising a downwardly inclined portion joining the upper plate to the top flanges of said longitudinal beams.

12. The chassis of claim 11 wherein said lower plate of the gooseneck assembly integrally includes a pair of upstanding longitudinally extending flanges defining sides of the fabricated tube, said upper plate being fixed to upper portions of the pair of side-defining flanges.

a longitudinally extending fabricated tube including an upper plate and a lower plate positioned parallel to each other, a rearward portion of the lower plate including a pair of longitudinal slots, each slot receiving in fixed relation the web of one of said longitudinal beams, a rearward margin of said upper plate of the gooseneck assembly comprising a downwardly inclined portion joining the upper plate to the top flanges of said longitudinal beams.

13. The chassis of claim 11 wherein the gooseneck assembly additionally includes a plurality of cross members fixed between the upper and lower plates for maintaining said upper and lower plates in parallel relation.

14. The chassis of claim 13 wherein the gooseneck assembly additionally includes a vertically oriented web extension fixed to each top flange upper surface in planar alignment with the web of each longitudinal beam, the web extension running from a rearward margin of said upper plate of the gooseneck assembly to a rearmost of said cross members fixed between the upper and lower plates.

15. A chassis for hauling freight containers, the chassis including a pair of spaced apart longitudinal beams, each beam having a top flange and a bottom flange united by a web, and a gooseneck assembly secured to a forward end of the beams, the assembly including a kingpin for coupling the chassis to a tractor fifth wheel, the gooseneck assembly comprising:

a fabricated tube extending longitudinally to define substantially the entire length of the gooseneck assembly, the fabricated tube including a lower plate having a pair of upstanding longitudinally extending flanges defining sides of the fabricated tube, a rearward portion of the lower plate including a pair of longitudinal slots, each slot receiving in fixed relation the web of one of said longitudinal beams, and an upper plate positioned parallel to the lower plate and fixed to upper portions of the side-defining flanges, and a vertically oriented web extension fixed to each top flange upper surface in planar alignment with the web of each longitudinal beam and contacting the upper plate lower surface, the web extension running from a rearward margin of said upper plate of the gooseneck assembly to a point forward of forward end of each web of the longitudinal beams.

16. A chassis for hauling freight containers, the chassis including a pair of spaced apart longitudinal beams, each beam having a top flange and a bottom flange united by a web, and a gooseneck assembly secured to a forward end of the beams, the assembly including a kingpin for coupling the chassis to a tractor fifth wheel, the gooseneck assembly comprising:

a fabricated tube extending longitudinally to define substantially the entire length of the gooseneck assembly, the fabricated tube including a lower plate having a pair of upstanding longitudinally extending flanges defining sides of the fabricated tube, a rearward portion of the lower plate including a pair of longitudinal slots, each slot receiving in fixed relation the web of one of said longitudinal beams, and an upper plate positioned parallel to the lower plate and fixed to upper portions of the side-defining flanges, a rearward margin of said upper plate of the gooseneck assembly including a downwardly inclined portion joining the upper plate to an upper surface of the top flanges of said longitudinal beams, the top flange of each longitudinal beam being fixed to an upper surface of the lower plate of the fabricated tube so that a lower surface of each top flange is in surface-to-surface contact with the lower plate upper surface.

17. A chassis for hauling freight containers, the chassis including a pair of spaced apart longitudinal beams, each beam having a top flange and a bottom flange united by a web, and a gooseneck assembly secured to a forward end of the beams, the assembly including a kingpin for coupling the chassis to a tractor fifth wheel, the gooseneck assembly comprising:

a fabricated tube extending longitudinally to define substantially the entire length of the gooseneck assembly, the fabricated tube including a lower plate having a pair of upstanding longitudinally extending flanges defining sides of the fabricated tube, a rearward portion of the lower plate including a pair of longitudinal slots, each slot receiving in fixed relation the web of one of said longitudinal beams, and an upper plate positioned parallel to the lower plate and fixed to upper portions of the side-defining flanges, the gooseneck assembly additionally comprising: a plurality of cross members fixed between the upper and lower plates for maintaining said upper and lower plates in parallel relation, and vertically oriented web extensions fixed to each top flange upper surface in planar alignment with the web of each longitudinal beam, the web extensions running from a rearward margin of said upper plate of the gooseneck assembly to a rearmost of said cross members fixed between the upper and lower plates.

18. The chassis of claim 17 wherein said forward end of each longitudinal beam web includes: an upwardly and forwardly tapered edge, and a beam closeout tie having a first portion attached to a lower surface of the lower plate of the fabricated tube, a second portion joined to the upwardly and forwardly tapered edge of the web of each longitudinal beam, and a third portion attached to a lower surface of the bottom web of each beam.

19. The chassis of claim 18 further comprising first web stiffening means extending from a forward end of the lower flange of each longitudinal beam to a rearward margin of said lower plate, and second web stiffening means extending perpendicularly from a forward end of the lower flange of each longitudinal beam to the lower surface of said lower plate.

20. A chassis for hauling freight containers, the chassis including a pair of spaced apart longitudinal beams, each beam having a top flange and a bottom flange united by a web, and a gooseneck assembly secured to a forward end of the beams, the assembly including a kingpin for coupling the chassis to a tractor fifth wheel, the gooseneck assembly comprising:

a longitudinally extending fabricated tube including an upper plate and a lower plate positioned parallel to each other, a rearward portion of the lower plate including a pair of longitudinal slots, each slot receiving in fixed relation the web of one of said longitudinal beams, a plurality of cross members fixed between the upper and lower plates for maintaining said upper and lower plates in parallel relation, and a vertically oriented web extension fixed to each top flange upper surface in planar alignment with the web of each longitudinal beam, the web extension running from a rearward margin of said upper plate of the gooseneck assembly to a rearmost of said cross members fixed between the upper and lower plates.

* * * * *

UNITED STATES PATENT AND TRADEMARK OFFICE
CERTIFICATE OF CORRECTION

PATENT NO. : 5,322,314

DATED : June 21, 1994

INVENTOR(S) : Louis F. Blum

It is certified that error appears in the above-identified patent and that said Letters Patent is hereby corrected as shown below:

At column 5, line 11, please delete "4", and insert therefor --3--; and

At column 6, please delete lines 14 through 22.

Signed and Sealed this

Thirteenth Day of September, 1994

*Attest:*

BRUCE LEHMAN

*Attesting Officer*    *Commissioner of Patents and Trademarks*